(12) United States Patent
Van Wiemeersch et al.

(10) Patent No.: US 12,503,886 B2
(45) Date of Patent: Dec. 23, 2025

(54) SYSTEMS AND METHODS TO ENABLE A VEHICLE TO EXIT DOUBLE-LOCK MODE

(71) Applicant: Ford Global Technologies, LLC, Dearborn, MI (US)

(72) Inventors: John Robert Van Wiemeersch, Novi, MI (US); Simon John William Hurr, Grays (GB)

(*) Notice: Subject to any disclaimer, the term of this patent is extended or adjusted under 35 U.S.C. 154(b) by 323 days.

(21) Appl. No.: 18/321,361

(22) Filed: May 22, 2023

(65) Prior Publication Data
US 2024/0392612 A1  Nov. 28, 2024

(51) Int. Cl.
*E05B 77/28* (2014.01)
*B60R 25/102* (2013.01)
*B60R 25/23* (2013.01)
*B60R 25/24* (2013.01)

(52) U.S. Cl.
CPC .......... *E05B 77/287* (2013.01); *B60R 25/102* (2013.01); *B60R 25/23* (2013.01); *B60R 25/243* (2013.01)

(58) Field of Classification Search
None
See application file for complete search history.

(56) References Cited

U.S. PATENT DOCUMENTS

| 7,768,380 | B2 | 8/2010 | Breed et al. |
| 10,351,102 | B2 | 7/2019 | Park |
| 11,345,415 | B2 | 5/2022 | Funyak et al. |
| 2011/0248844 | A1* | 10/2011 | Elias ........................ E05B 77/28 701/36 |
| 2018/0025604 | A1 | 1/2018 | Protopsaltis et al. |
| 2019/0390485 | A1* | 12/2019 | Konchan ................ E05B 77/287 |
| 2022/0089123 | A1 | 3/2022 | DeLong et al. |

OTHER PUBLICATIONS

Lincoln, How Do I Use My Lincoln's Phone as a Key™* Backup Start Passcode?, pp. 1-2.

* cited by examiner

*Primary Examiner* — Navid Z. Mehdizadeh
*Assistant Examiner* — Jason R Roberson
(74) *Attorney, Agent, or Firm* — Frank Lollo; Eversheds Sutherland (US) LLP

(57) ABSTRACT

A vehicle including a first detection unit, a second detection unit, and a processor is disclosed. The first detection unit may be configured to detect presence of an occupant inside the vehicle. The second detection unit may be configured to detect that the vehicle may be in a double-lock mode. The processor may be configured to obtain inputs from the first detection unit and the second detection unit. Responsive to obtaining the inputs, the processor may determine that a predetermined condition is met. The predetermined condition may be met when the occupant may be present inside the vehicle and the vehicle may be in the double-lock mode. The processor may be further configured to output a notification comprising instructions for the occupant to perform a predetermined action responsive to a determination that the predetermined condition is met to enable the vehicle to exit the double-lock mode.

15 Claims, 6 Drawing Sheets

SYSTEMS AND METHODS TO ENABLE A VEHICLE TO EXIT DOUBLE-LOCK MODE

TECHNICAL FIELD

The present disclosure relates to systems and methods to enable a vehicle to exit double-lock mode and more particularly to systems and methods to enable the vehicle to exit from the double-lock mode when an occupant presence may be detected in the vehicle.

BACKGROUND

Many modern vehicles include double-lock mechanisms in which vehicle handles are mechanically or electronically disassociated from the latch resulting in no unlocking or unlatching action then the handle is actuated or pushed. When a vehicle may be in a double-lock mode, a user may not be able to open vehicle doors using the interior door handle or the exterior door handle or switch ON the vehicle ignition. In some instances, the vehicle may enter the double-lock mode by using a key fob or Phone-as-a Key (PaaK). Similarly, the vehicle may exit the double-lock mode by using the key fob or PaaK.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
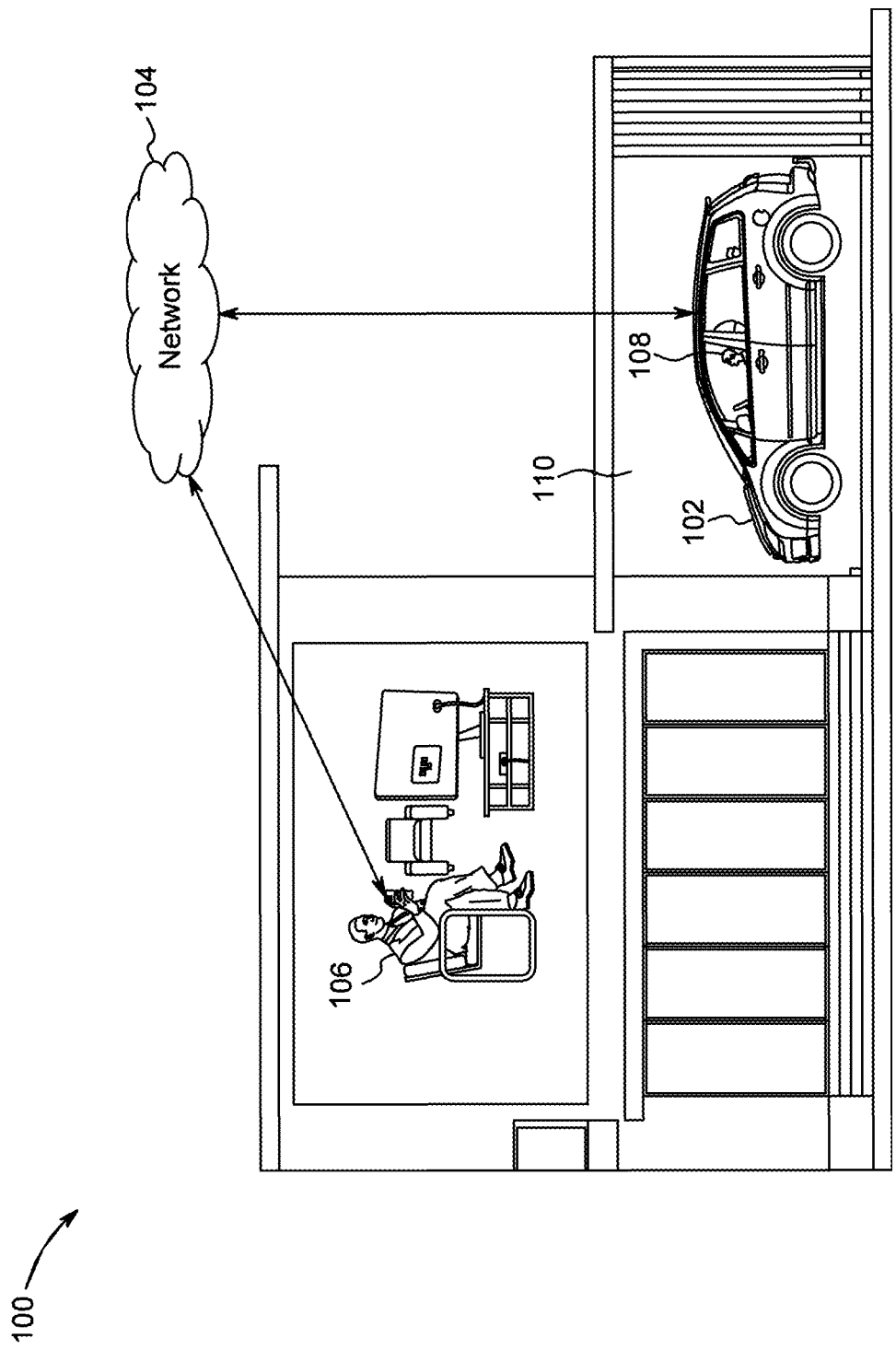
FIG. 1 depicts an example of an environment in which techniques and structures for providing the systems and methods disclosed herein may be implemented.

The present disclosure describes systems and methods to enable a vehicle to exit a double-lock mode when a predetermined condition may be met. The predetermined condition may be met, for example, when an occupant may be present in the vehicle (e.g., remains behind in the vehicle), and the vehicle may be in the double-lock mode with all vehicle doors/hatches/trunk/frunk in a closed state. In some aspects, the system may be configured to obtain inputs from vehicle sensors and/or vehicle cameras and determine that the predetermined condition may be met based on the obtained inputs. The vehicle sensors and/or the vehicle cameras may be configured to detect that the occupant may be present in the vehicle and that the vehicle may be in the double-lock mode. Responsive to a determination that the predetermined condition may be met, the system may output a notification requesting the occupant to perform a predetermined action that may enable the system to authenticate the occupant and cause the vehicle to exit the double-lock mode.

In some aspects, the predefined action may include that the system requests the occupant to perform may include providing occupant consent to capture or record occupant image/video and transmit the captured image/video to a vehicle owner device. Responsive to receiving the notification from the system requesting the occupant to provide the consent, the occupant may provide the consent, which may be received by the system. The system may then capture the occupant image/video and transmit the occupant image/video to the vehicle owner device. In some aspects, the system may capture the occupant image/video without requesting the consent from the occupant, and may notify that cabin/vehicle environment is being recorded via a vehicle speaker. Responsive to receiving the image/video, the vehicle owner may either remotely unlock the vehicle via the vehicle owner device or remotely start the vehicle when the occupant may be an authorized occupant known to the vehicle owner. On the other hand, in some instances, the vehicle owner may not unlock the vehicle when the occupant may not be an authorized occupant.

In other aspects, the predefined action may include that the system requests the occupant to perform may include entering or inputting a passcode on a vehicle human machine interface (HMI). Responsive to receiving the notification from the system requesting the occupant to input the passcode, the occupant may enter the passcode, which may be received by the system. The system may then match the passcode with a pre-stored passcode. The system may cause the vehicle to exit the double-lock mode when the passcode matches with the pre-stored passcode.

In yet another aspect, the predefined action may include that the system requests the occupant to perform may include entering or inputting responses to a questionnaire on the vehicle HMI. Responsive to receiving the notification from the system requesting the occupant to input the responses, the occupant may enter the responses, which may be received by the system. The system may then match the responses with pre-stored responses. The system may cause the vehicle to exit the double-lock mode when the responses match with the pre-stored responses.

The present disclosure is directed to systems and methods that may enable an occupant who is in the vehicle to leave the vehicle when the vehicle may be in the double-lock mode. Since the system authenticates the occupant before enabling the vehicle to exit the double-lock mode, vehicle security may not be compromised. Further, in some instances, the system seeks occupant consent before sharing occupant images/videos with the vehicle owner, thereby ensuring that occupant privacy may also not be compromised.

Illustrative Embodiments

The disclosure will be described more fully hereinafter with reference to the accompanying drawings, in which example embodiments of the disclosure are shown, and not intended to be limiting.

FIG. 1 depicts an example of an environment 100 in which techniques and structures for providing the systems and methods disclosed herein may be implemented. The environment 100 may include a vehicle 102 that may take the form of any passenger or commercial vehicle such as, for example, an off-road vehicle, a car, a crossover vehicle, a van, a minivan, a bus, a truck, etc. Further, the vehicle 102 may include any powertrain such as, for example, a gasoline engine, one or more electrically-actuated motor(s), a hybrid system, etc. Furthermore, the vehicle 102 may be a manually driven vehicle and/or be configured and/or programmed to operate in a fully autonomous (e.g., driverless) mode (e.g., Level-5 autonomy) or in one or more partial autonomy modes which may include driver assist technologies.

The vehicle 102 may be connected to one or more network(s) 104. The network(s) 104 illustrates an example of a communication infrastructure in which the connected devices discussed in various embodiments of this disclosure may communicate. The network(s) 104 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may be configured to enter and exit a double-lock mode based on user commands. For example, a vehicle owner (or user) 106 may cause the vehicle 102 to enter the double-lock mode by using an authorized key. The authorized key may include a device, a code, or a biometric attribute. For example, the vehicle owner 106 may use traditional bladed key, active key fob, Passive entry passive start (PEPS) key fob (active or passive unlock), Door PEPS Lock Switch, a Phone-as-a-Key (PaaK), Near Field Communication (NFC), PaaK BLE/UWB (via PaaK App Human-Machine Interface (HMI)) etc. to enter the double-lock mode and securely lock the vehicle 102. The vehicle 102 may enter the double-lock when the driver's door (e.g., vehicle owner 106 door) may be fully closed. Similarly, the vehicle owner 106 may cause the vehicle 102 to exit the double-lock mode by using the authorized key. For example, the vehicle 102 may exit the double-lock mode by using traditional bladed key, active key fob, PEPS key fob (passive or active), PaaK NFC, PaaK BLE/UWB (passive or active), mobile application, or a passcode etc., In some aspects, vehicle doors may not open by using either the interior vehicle door handle or the exterior vehicle door handle when the vehicle 102 is in the double-lock mode. The vehicle doors may open via the authorized key when the vehicle 102 is in the double-lock mode. In addition, vehicle engine may not be switched ON when the vehicle 102 is in the double-lock mode. In some instances, the vehicle engine may be switched ON when the vehicle owner 106 causes the vehicle 102 to exit the double-lock mode and/or when the vehicle owner 106 enables vehicle engine activation by using the authorized key.

In an exemplary aspect depicted in FIG. 1, an occupant 108 may be in the vehicle 102 when the vehicle owner 106 may cause the vehicle 102 to enter the double-lock mode. For example, the vehicle owner 106 may park the vehicle 102 in a home garage 110 for a short time duration and may cause the vehicle 102 to enter the double-lock mode by using the authorized key while the occupant 108 may still be present (e.g., sitting at a vehicle sitting area) in the vehicle 102. In some aspects, the vehicle owner 106 may be aware that the occupant 108 is present inside the vehicle 102. Since the vehicle 102 is in the double-lock mode, the occupant 108 may not be able to exit the vehicle 102 by using the interior vehicle door handle and may not be able to leave the vehicle 102 until the vehicle owner 106 unlocks the vehicle 102 by using the authorized key.

In accordance with the present disclosure, the vehicle 102 may include an occupant security system or "system" (shown as occupant security system 208 in FIG. 2) that may be configured to determine that the occupant 108 may be in the vehicle 102 and the vehicle 102 may be in the double-lock mode. Responsive to such determination, the system may enable the vehicle 102 to exit the double-lock mode responsive to the occupant 108 and/or the vehicle owner 106 performing one or more predetermined actions so that the occupant 108 may leave the vehicle 102. In some aspects, the system may enable the occupant 108 to switch ON the vehicle ignition when the vehicle 102 may be in the double-lock mode; however, in some instances, the system may not enable the occupant 108 to drive the vehicle 102 or cause vehicle movement.

In some aspects, to enable the vehicle 102 to exit the double-lock mode, the system may first determine whether a predetermined condition is met when the occupant 108 may be in the vehicle 102. In an exemplary aspect, the predetermined condition may be met when the occupant 108 may be in the vehicle 102 and the vehicle 102 may be in the double-lock mode (e.g., all vehicle doors/hatches/trunk/frunk may be closed). Responsive to a determination that the predetermined condition is met, the system may request the occupant 108 and/or the vehicle owner 106 to perform one or more predefined actions or operations, which may enable the vehicle 102 to exit the double-lock mode. Details of the predefined actions or operations are described below in conjunction with FIG. 2.

The vehicle 102, the vehicle owner 106, and/or the occupant 108 may implement and/or perform operations, as described here in the present disclosure, in accordance with the owner manual and safety guidelines.

Figure 2:
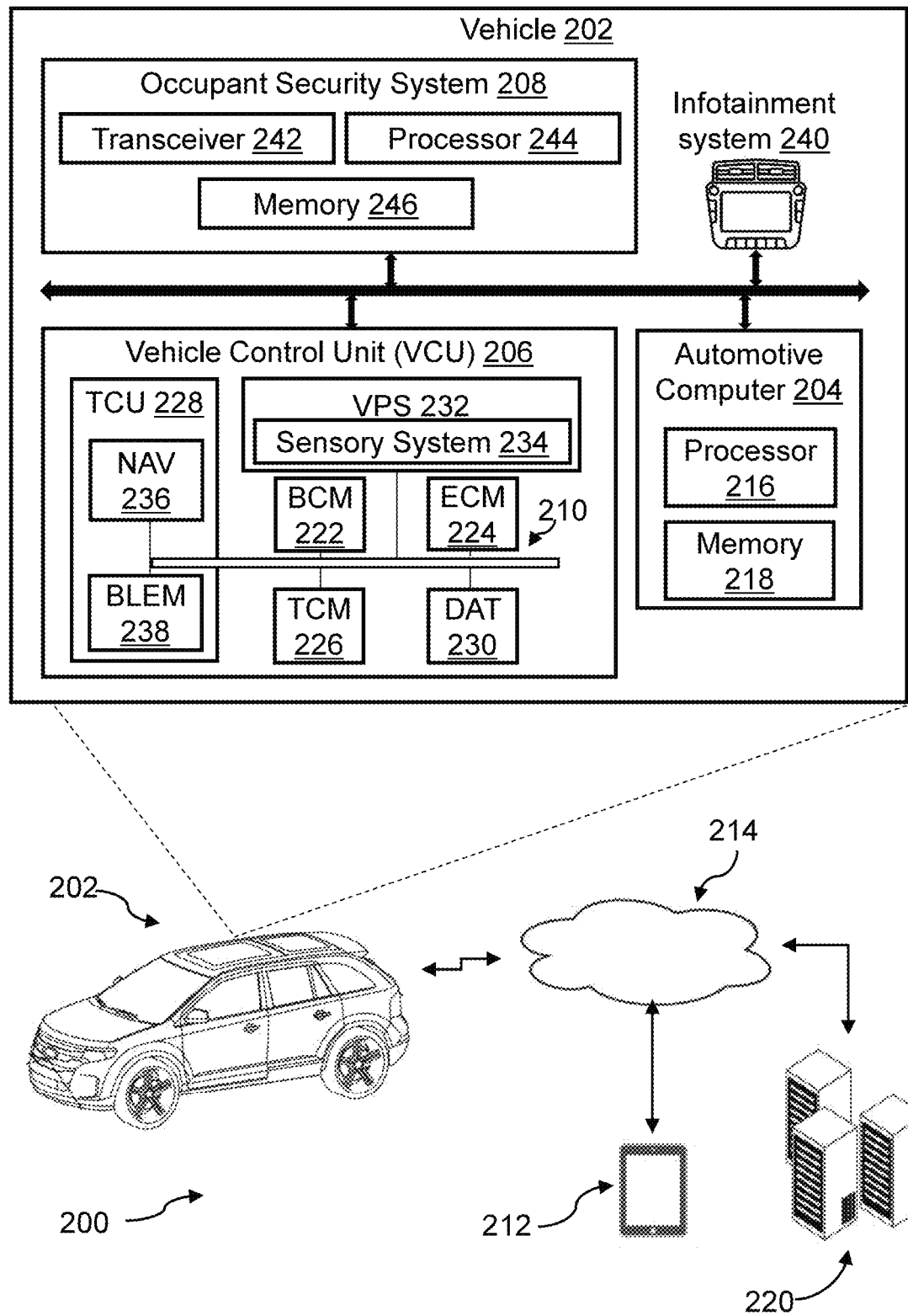
FIG. 2 depicts a block diagram of an example system to enable a vehicle to exit double-lock mode, in accordance with the present disclosure.

FIG. 2 depicts a block diagram of an example of a system 200 to enable a vehicle to exit double-lock mode, in accordance with the present disclosure. While describing FIG. 2, references may be made to FIGS. 3-5.

The system 200 may include a vehicle 202 that may be same as the vehicle 102. The vehicle 202 may include an automotive computer 204, a Vehicle Control Unit (VCU) 206, and an occupant security system 208 (same as the occupant security system described in conjunction with FIG. 1). The VCU 206 may include a plurality of Electronic Control Units (ECUs) 210 disposed in communication with the automotive computer 204 and the occupant security system 208.

The system 200 may further include a mobile device 212 that may connect with the automotive computer 204 and/or the occupant security system 208 by using wired and/or wireless communication protocols and transceivers. In some aspects, the mobile device 212 may be associated with a vehicle user/owner (same as the vehicle owner 106 described in conjunction with FIG. 1). The mobile device 212 may communicatively couple with the vehicle 202 via one or more network(s) 214, which may communicate via one or more wireless connection(s) and/or may connect with the vehicle 202 directly by using near field communication (NFC) protocols, Bluetooth® protocols, Wi-Fi, Ultra-Wideband (UWB), and other possible data connection and sharing techniques. The network 214 may be same as the network 104.

In some aspects, the automotive computer 204 and/or some components of the occupant security system 208 may be installed in a vehicle engine compartment (or elsewhere in the vehicle 202) in accordance with the disclosure. Further, the automotive computer 204 may operate as a functional part of the occupant security system 208. The automotive computer 204 may be or include an electronic vehicle controller having one or more processor(s) 216 and a memory 218. Moreover, the occupant security system 208 may be separate from the automotive computer 204 (as shown in FIG. 2) or may be integrated as part of the automotive computer 204.

The processor(s) 216 may be disposed in communication with one or more memory devices (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing an occupant security program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM)), etc.

In some aspects, the automotive computer 204 and/or the occupant security system 208 may be disposed in communication with one or more server(s) 220 and the mobile device 212. The server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In some aspects, the server 220 may additionally store personal or historical details associated with the vehicle owner 106 or the vehicle 202, such as vehicle owner details (including contact details), vehicle historical usage information, and/or the like. The server 220 may be configured to transmit the personal or historical details to the vehicle 202 via the network(s) 214.

The VCU 206 may share a power bus with the automotive computer 204 and may be configured and/or programmed to coordinate the data between vehicle 202 systems, connected servers (e.g., the server(s) 220), and other vehicles (not shown in FIG. 2). The VCU 206 can include or communicate with any combination of the ECUs 210, such as, for example, a Body Control Module (BCM) 222 or HPCC-A (High Performance Compute Cluster), an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232 having connectivity with and/or control of one or more vehicle sensory system(s) 234. The sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, vehicle interior and exterior cameras, door lock sensors, window sensors, etc.

In some aspects, the sensory system 234 may include a first detection unit and a second detection unit. The first detection unit may be configured to detect an occupant presence (e.g., presence of the occupant 108) inside the vehicle 202, and the second detection unit may be configured to detect that the vehicle 202 may be in the double-lock mode. The first detection unit may include an occupant detection sensor and/or vehicle interior camera(s). The occupant detection sensor may include any sensor that may be configured to detect occupant 108 presence in the vehicle 202 including, but not limited to, motion sensor, pressure sensor, radar sensor, sitting area buckle sensor, sitting area sensor, etc. For example, the occupant detection sensor may detect occupant presence when the occupant 108 uses any vehicle switch or component with intent to unlock the vehicle door, open the vehicle window, remove sitting area belt, etc. When the occupant detection sensor detects occupant presence, the occupant detection sensor may trigger vehicle interior camera(s) to confirm occupant presence inside the vehicle 202. The second detection unit may include the door lock sensors, etc. The door lock sensors may be configured to detect when the vehicle doors/hatches/trunk/frunk may be in locked state.

In some aspects, the VCU 206 may control vehicle operational aspects and implement one or more instruction sets received from the mobile device 212, from one or more instruction sets stored in the memory 218, including instructions operational as part of the occupant security system 208.

The TCU 228 can be configured and/or programmed to provide vehicle connectivity to wireless computing systems onboard and off board the vehicle 202 and may include a Navigation (NAV) receiver 236 for receiving and processing a GPS signal, a BLE® Module (BLEM) 238 or BUN (BLE, UWB, NFC module), a Wi-Fi transceiver, a UWB transceiver, and/or other wireless transceivers (not shown in FIG. 2) that may be configurable for wireless communication between the vehicle 202 and other systems (e.g., a vehicle authorized key, not shown in FIG. 2), computers, and modules. The TCU 228 may be disposed in communication with the ECUs 210 by way of a bus.

In one aspect, the ECUs 210 may control aspects of vehicle operation and communication using inputs from human drivers, inputs from an autonomous vehicle controller, the occupant security system 208, and/or via wireless signal inputs received via the wireless connection(s) from other connected devices, such as the mobile device 212, the server(s) 220, among others.

The BCM 222 generally includes integration of sensors, vehicle performance indicators, and variable reactors associated with vehicle systems and may include processor-based power distribution circuitry that can control functions associated with the vehicle body such as lights, windows, security, camera(s), audio system(s), speakers, door locks and access control, vehicle energy management, and various comfort controls. The BCM 222 may also operate as a gateway for bus and network interfaces to interact with remote ECUs (not shown in FIG. 2).

In some aspects, the DAT controller 230 may provide Level-1 through Level-3 automated driving and driver assistance functionality that can include, for example, active parking assistance, trailer backup assistance, adaptive cruise control, lane keeping, and/or driver status monitoring, among other features. The DAT controller 230 may also provide aspects of user and environmental inputs usable for user authentication.

In some aspects, the automotive computer 204 may connect with an infotainment system 240 that may include a touchscreen interface portion and may include voice or speech recognition features, biometric identification capabilities that can identify users based on facial recognition, voice recognition, fingerprint identification, or other biological identification means. In other aspects, the infotainment system 240 may be further configured to receive user instructions or authentication passwords/passcodes/responses via the touchscreen interface portion and/or display notifications/questionnaire, navigation maps, etc. on the touchscreen interface portion. In some aspects, the infotainment system 240 may be configured to display instruction/notification/request to a user (e.g., the occupant 108). The infotainment system 240 may display language options so that the occupant 108 may select a language the occupant 108 may recognize in either text form or speech form. The infotainment system 240 may select last used language as the default language or may display last used language at the top. The infotainment system 240 may display other languages in the top that may be commonly used in a location where the vehicle 202 may be located (as identified from GPS signals).

The computing system architecture of the automotive computer 204, the VCU 206, and/or the occupant security system 208 may omit certain computing modules. It should be readily understood that the computing environment depicted in FIG. 2 is an example of a possible implementation according to the present disclosure, and thus, it should not be considered limiting or exclusive.

In accordance with some aspects, the occupant security system 208 may be integrated with and/or executed as part of the ECUs 210. The occupant security system 208, regardless of whether it is integrated with the automotive computer 204 or the ECUs 210 or whether it operates as an independent computing system in the vehicle 202, may include a transceiver 242, a processor 244, and a computer-readable memory 246. The transceiver 242 may be configured to receive information/inputs from external devices or systems, e.g., the mobile device 212, the server 220, and/or the like. Further, the transceiver 242 may transmit notifications (e.g., alert/alarm signals, occupant detection notification, etc.) to the external devices or systems. For example, the transceiver 242 may transmit an alert notification to the mobile device 212 when the occupant security system 208 determines the presence of the occupant 108 in the vehicle 202 when the vehicle 202 may be in the double-lock mode.

The processor 244 and the memory 246 may be the same as or similar to the processor 216 and the memory 218, respectively. Specifically, the processor 244 may utilize the memory 246 to store programs in code and/or to store data for performing aspects in accordance with the disclosure. The memory 246 may be a non-transitory computer-readable memory storing the occupant security program code. In some aspects, the memory 246 may be configured to store passcode/password to exit the double-lock mode of the vehicle 202 (e.g., as a backup mechanism to exit the double-lock mode). The memory 246 may be further configured to store a questionnaire and respective responses to exit the double-lock mode of the vehicle 202 (e.g., as another backup mechanism to exit the double-lock mode). In some aspects, the questionnaire and respective responses may be associated with the personal or historical information that the memory 246 may obtain from the server 220 via the transceiver 242.

In operation, the processor 244 may obtain inputs from the sensory system 234 at a predefined frequency. Specifically, the processor 244 may obtain inputs from the first detection unit and the second detection unit at the predefined frequency. In some aspects, the processor 244 may obtain inputs from the first detection unit when the second detection unit detects that the vehicle 202 may be in the double-lock mode. For example, the processor 244 may obtain inputs associated with occupant 108 presence from the first detection unit and inputs associated with vehicle double-lock mode (e.g., whether the vehicle 202 is in the double-lock mode or not, whether vehicle doors/trunk are in the closed state or open state) from the second detection unit.

Responsive to obtaining the inputs from the first detection unit and the second detection unit, the processor 244 may determine that a predetermined condition is met. In some aspects, the predetermined condition may be met when the occupant 108 may be present inside the vehicle 202 and the vehicle 202 may be in the double-lock mode.

Responsive to a determination that the predetermined condition may be met, the processor 244 may be configured to enable the vehicle 202 to exit the double-lock mode based on the occupant 108 and/or the vehicle owner 106 performing one or more predefined actions. For example, responsive to determining that the predetermined condition may be met, the processor 244 may output a notification requesting the occupant 108 to perform one or more predetermined/predefined actions to enable the vehicle 202 to exit the double-lock mode. The details of such actions may be understood in conjunction with FIGS. 3-5.

Figure 3:
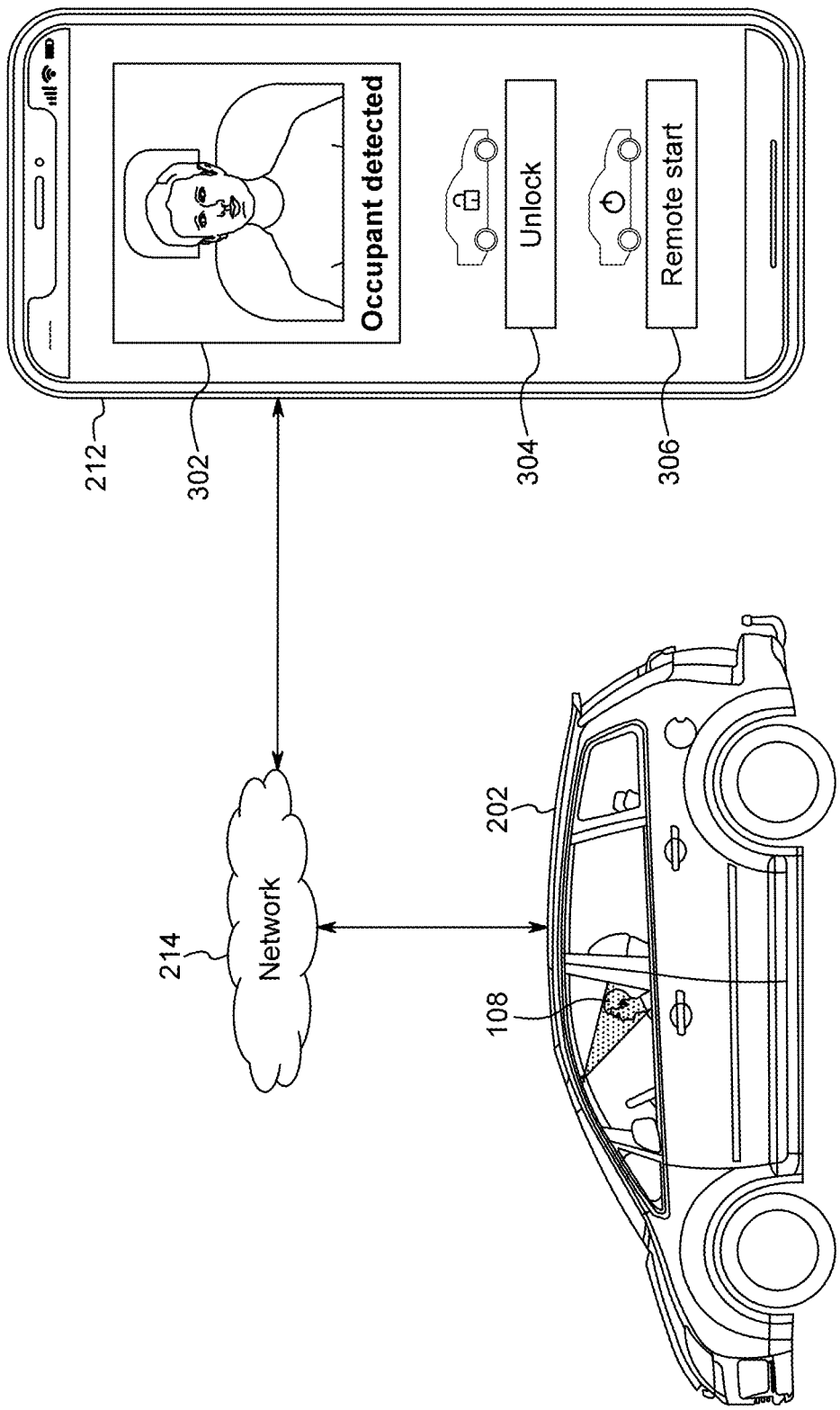
FIG. 3 depicts an example of a first predetermined action to exit the double-lock mode in accordance with the present disclosure.

FIG. 3 depicts an example of a first predetermined action to exit the double-lock mode in accordance with the present disclosure. In some aspects, the processor 244 may be configured to output a notification requesting the occupant 108 to perform the first predetermined action responsive to determining that the predetermined condition may be met. In this case, the processor 244 may request the occupant 108 to provide the occupant consent to capture or record the occupant's image or video and transmit the captured image/video to the mobile device 212 associated with the vehicle owner 106. In some aspects, the processor 244 may output the notification via the infotainment system 240 or vehicle human machine interface (HMI) (e.g., by visually displaying the notification on the infotainment system 240) and/or via a vehicle speaker (not shown). Responsive to the processor 244 outputting the notification, the occupant 108 may view/receive the notification and may provide consent to capture and transmit the image/video to the mobile device 212. The occupant 108 may provide the consent via the infotainment system 240 or via audio or gesture commands.

The processor 244 may receive the consent from the occupant 108 and may capture or record the occupant 108 image/video by using the vehicle interior camera(s) responsive to receiving the consent. In some aspects, the processor 244 may capture the occupant 108 image/video without requesting the consent from the occupant 108, and may notify that the cabin/vehicle environment is being recorded via a vehicle speaker. The processor 244 may further transmit the captured occupant image/video to the mobile device 212 via the transceiver 242 and the network 214, indicating to the mobile device 212 or the vehicle owner 106 that the occupant 108 is detected inside the vehicle 202 (shown as view 302 in FIG. 3). In an exemplary aspect, the processor 244 may transmit the captured image/video to an application or "app" (associated with PaaK) on the mobile device 212 via the transceiver 242 and the network 214. The processor 244 may be further configured to request, via the mobile device 212, the vehicle owner 106 to either unlock the vehicle 202 (shown as an icon 304 in FIG. 3) or remote start the vehicle 202 (shown as an icon 306 in FIG. 3).

Responsive to receiving the request, the vehicle owner 106 may view the captured image/video and choose to unlock the vehicle 202 or start the vehicle 202 remotely by using the app based on the image/video (for example, when the occupant 108 may be an authorized person such as a family member, a friend, etc.). The mobile device 212 may receive an input from the vehicle owner 106 and transmit a command to the vehicle 202 to exit the double-lock mode and/or start the vehicle 202 based on the received input. The processor 244 may obtain the command from the mobile device 212, via the transceiver 242, and may cause the vehicle 202 to exit the double-lock mode and/or enable the occupant 108 to start the vehicle 202 based on the obtained command. For example, the processor 244 may transmit a command to the VCU 206 (e.g., the BCM 222) to cause the vehicle 202 to exit the double-lock mode. The VCU 206 may receive the command and may cause the vehicle 202 to exit the vehicle double-lock mode, thus enabling the occupant 108 to open the vehicle 202 using the vehicle interior handle and leave the vehicle 202. In this case, the processor 244 may not enable the occupant 108 to drive or move the vehicle 202.

In some aspects, when the vehicle owner 106 chooses to remote start the vehicle 202, the processor 244 may enable the occupant 108 to use certain vehicle components (e.g., air conditioner, heater, lights, Universal Serial Bus (USB), charging ports, etc.); however, in some instances, the processor 244 may not enable the occupant 108 to drive or move the vehicle 202.

In some aspects, the processor 244 may cause the infotainment system 240 and the mobile device 212 to display a code or a graphic and may request the occupant 108 and the vehicle owner 106 to identify the code/graphic to verify that the occupant 108 is inside the vehicle 202 before receiving the vehicle owner input to unlock or remote start the vehicle 202.

In further aspects, responsive to viewing the captured image/video on the mobile device 212, the vehicle owner 106 may report the presence of the occupant in the vehicle 202 to a third party (such as police) when the occupant 108 may be an unauthorized person.

Figure 4:
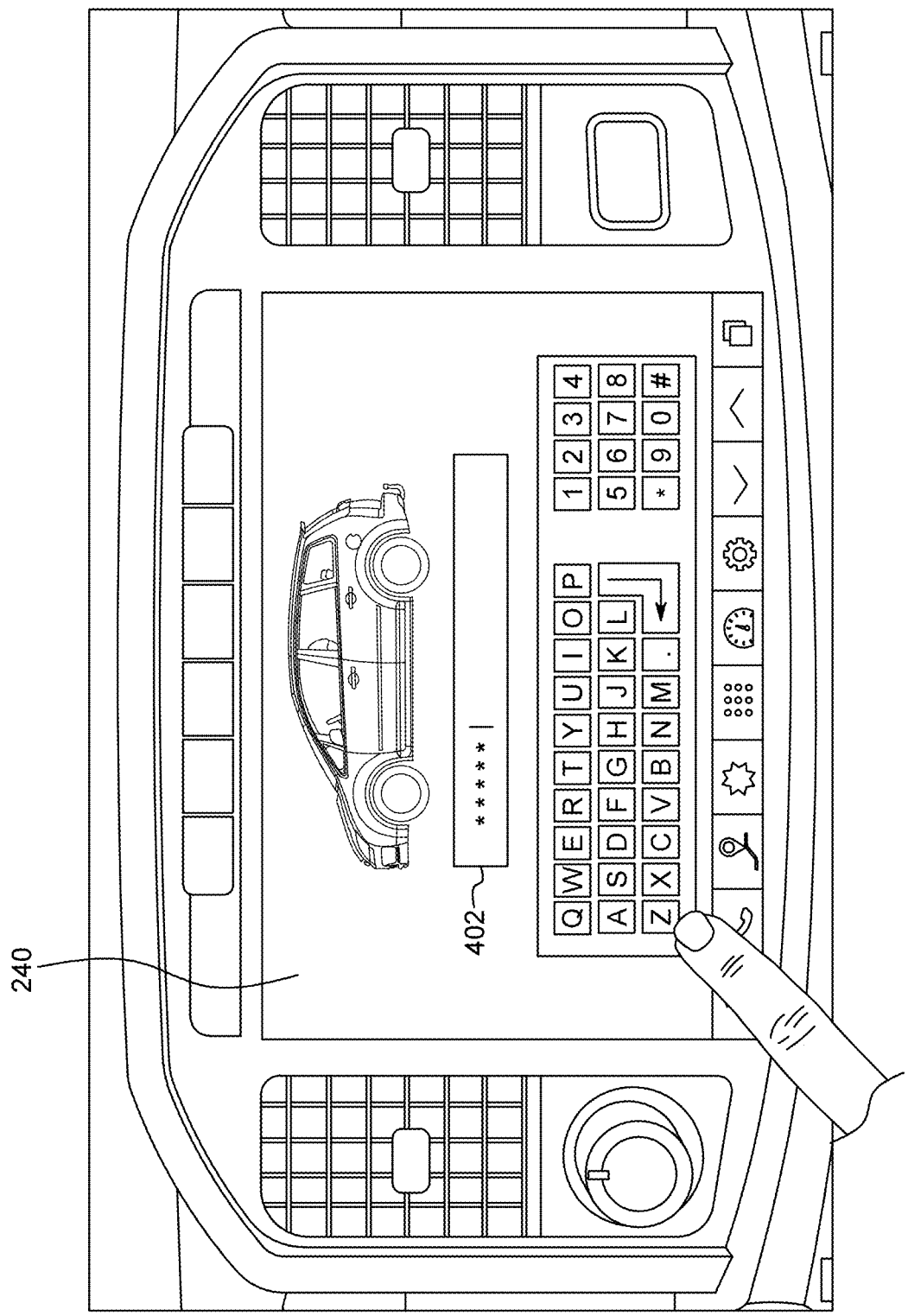
FIG. 4 depicts an example of a second predetermined action to exit the double-lock mode in accordance with the present disclosure.

FIG. 4 depicts an example second predetermined action to exit the double-lock mode in accordance with the present disclosure. In some aspects, the processor 244 may be configured to output a notification requesting the occupant 108 to perform the second predetermined action responsive to determining that the predetermined condition may be met. In this aspect, the processor 244 may request the occupant 108 to input a passcode on the infotainment system 240 (as an example) to exit the vehicle double-lock mode, shown in view 402 in FIG. 4. The passcode may be alpha-numeric that may be pre-set by the vehicle owner 106 based on the owner manual and safety guidelines. In some aspects, the processor 244 may output the notification via the infotainment system 240 or the vehicle HMI (e.g., by visually displaying the notification) and/or via a vehicle speaker (or any other vehicle component).

The occupant 108 may receive/view the notification and may input the passcode in the infotainment system 240 (e.g., by using a keypad of the infotainment system 240). Responsive to the occupant 108 inputting the passcode in the infotainment system 240, the processor 244 may obtain the passcode from the infotainment system 240. The processor 244 may further fetch a pre-stored passcode from the memory 246 (that may be set by the vehicle owner 106). The processor 244 may then compare the passcode obtained from the infotainment system 240 with the pre-stored passcode. The processor 244 may determine that the occupant 108 may be an authorized occupant when the passcode obtained from the infotainment system 240 matches with the pre-stored passcode. Responsive to a determination that the occupant 108 may be authorized, the processor 244 may transmit a command to the VCU 206 (e.g., the BCM 222) to cause the vehicle 202 to exit the double-lock mode. The VCU 206 may receive the command and may cause the vehicle 202 to exit the vehicle double-lock mode, thus enabling the occupant 108 to open the vehicle 202 using the vehicle interior handle and leave the vehicle 202. In this case, the processor 244 may not enable the occupant 108 to drive or move the vehicle 202.

In further aspects, the processor 244 may allow three attempts (as an example) by the occupant 108 to input the correct passcode. In a scenario where the passcodes obtained from the infotainment system 240 do not match with the pre-stored passcode in three attempts, the processor 244 may not enable the vehicle 202 to exit the double-lock mode and may not allow the occupant 108 to leave the vehicle 202. In this case, the processor 244 may transmit, via the transceiver 242, an alert notification to the mobile device 212.

Figure 5:
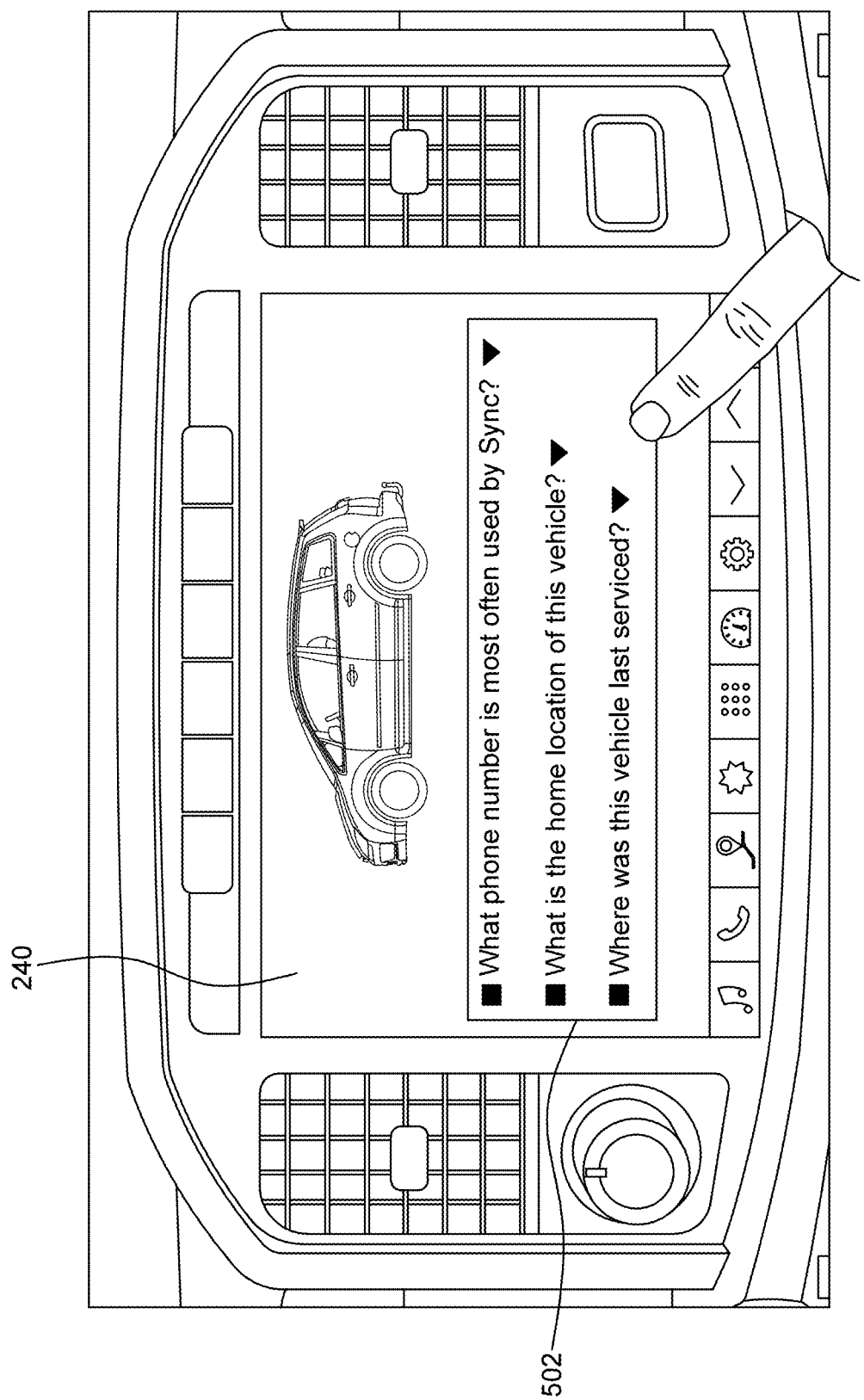
FIG. 5 depicts an example of a third predetermined action to exit the double-lock mode in accordance with the present disclosure.

FIG. 5 depicts an example third predetermined action to exit the double-lock mode in accordance with the present disclosure. In some aspects, the processor 244 may be configured to output a notification requesting the occupant 108 to perform the third predetermined action responsive to determining that the predetermined condition may be met. In this aspect, the processor 244 may be configured to output a notification requesting the occupant 108 to input responses to a plurality of questions (or a questionnaire) on the infotainment system 240 (as an example) to exit the vehicle double-lock mode, shown in view 502 of FIG. 5. In some aspects, the processor 244 may output the notification via the infotainment system 240 or the vehicle HMI (e.g., by visually displaying the notification) and/or via a vehicle speaker (or any other vehicle component).

In this case, the processor 244 may fetch the questionnaire from the memory 246 or the server 220 (along with respective correct responses) and may display the questionnaire on the infotainment system 240. The questionnaire may include personal and/or historical questions associated with the vehicle 202 and/or the vehicle owner 106 that an authorized occupant may answer. In some aspects, the processor 244 may display the questions along with multiple-choice list of possible answers. For example, the processor 244 may display questions such as "what phone number is most often used by Sync or the infotainment system 240," "what is the home location of the vehicle 202," "where was the vehicle 202 last serviced," "what is the vehicle owner's name," "how far was this vehicle driven prior to being parked," etc.

The occupant 108 may view the questionnaire on the infotainment system 240 and may input respective responses on the infotainment system 240, for example, by selecting one response from the multiple-choice list of possible answers. Responsive to the occupant 108 inputting the responses, the processor 244 may obtain the responses from the infotainment system 240 and may fetch pre-stored responses (i.e., the correct responses) from the memory 246. The processor 244 may then compare the responses obtained from the infotainment system 240 with the pre-stored responses. The processor 244 may determine that the occupant 108 may be an authorized occupant based on the comparison. For example, the processor 244 may determine that the occupant 108 may be authorized when a count of correct responses exceeds a predefined threshold, e.g., 70% of total questions included in the questionnaire. In some aspects, the processor 244 may change/vary the predefined threshold with vehicle interior temperature (as determined by the sensory system 234). For example, the predefined threshold may decrease as the vehicle interior temperature rises.

Responsive to a determination that the occupant 108 may be authorized, the processor 244 may transmit a command to the VCU 206 to cause the vehicle 202 to exit the double-lock mode. The VCU 206 may receive the command and may cause the vehicle 202 to exit the vehicle double-lock mode, thus enabling the occupant 108 to leave the vehicle 202. Similar to the aspect described above, in this aspect too, the processor 244 may not enable the occupant 108 to drive or move the vehicle 202.

In an exemplary scenario where the count of correct responses obtained from the infotainment system 240 does not exceed the predefined threshold, the processor 244 may not cause the vehicle 202 to exit the double-lock mode and may not enable the occupant 108 to leave the vehicle 202. In this case, the processor 244 may transmit, via the transceiver 242, an alert notification to the mobile device 212.

In some aspects, the processor 244 may provide the notification to the occupant 108 to select the predetermined action from the first predetermined action, the second predetermined action, or the third predetermined action. For example, the occupant 108 may receive such notification from the processor 244 and may select to input the passcode instead of transmitting the occupant image/video to the mobile device 212/vehicle owner 106 when the occupant 108 may be aware of the passcode.

In some aspects, the occupant 108 may not be aware of the passcode or responses to the questionnaire, but may have a phone. In such cases, the occupant 108 may call the vehicle owner 106 to get the passcode/responses over the phone or the local emergency or law enforcement providers for assistance.

Figure 6:
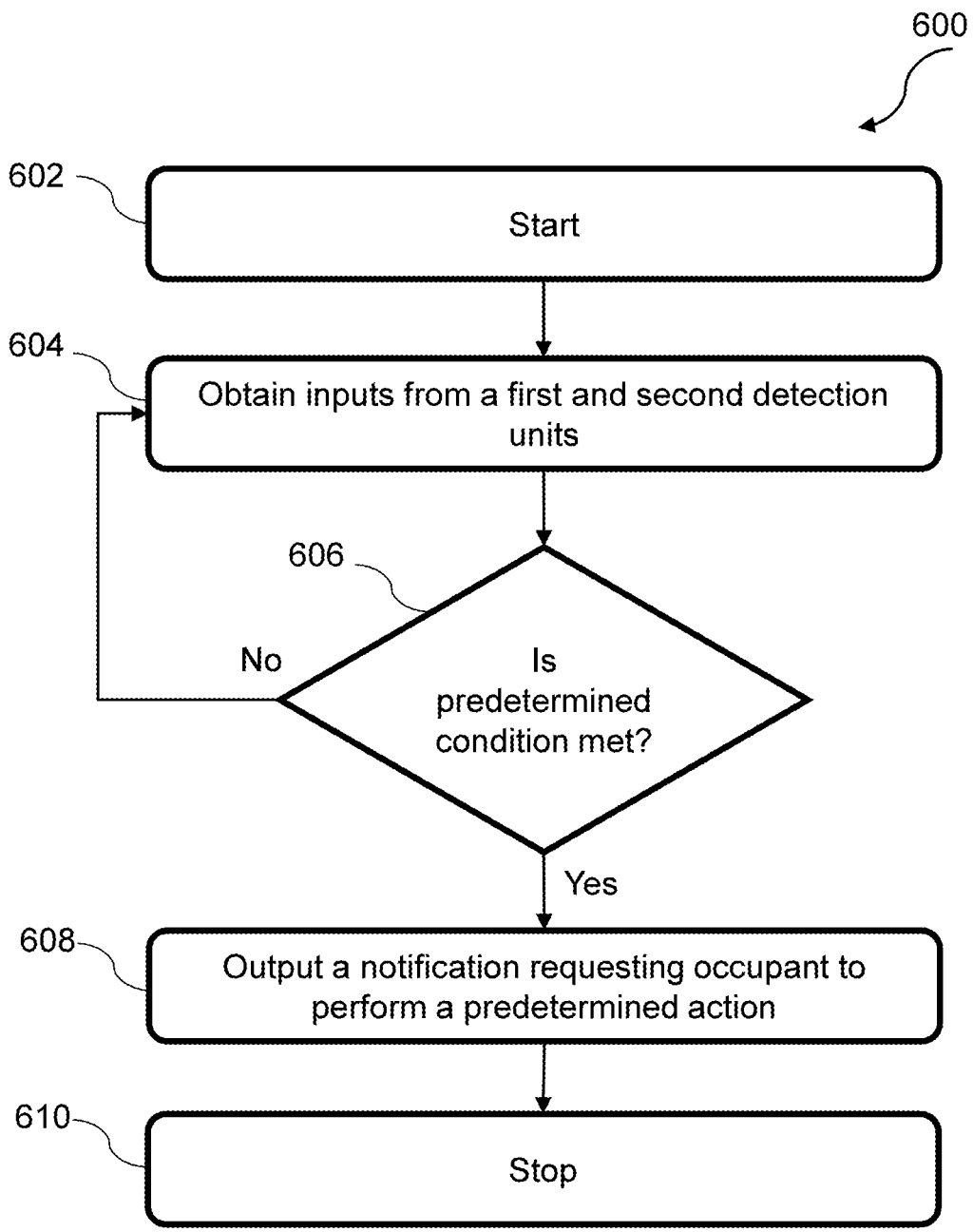
FIG. 6 depicts a flow diagram of an example method to enable a vehicle to exit a double-lock mode in accordance with the present disclosure.

FIG. 6 depicts a flow diagram of an example method 600 to enable the vehicle 202 exit the double-lock mode in accordance with the present disclosure. FIG. 6 may be described with continued reference to prior figures, including FIGS. 1-5. The following process is exemplary and not confined to the steps described hereafter. Moreover, alternative embodiments may include more or less steps that are shown or described herein and may include these steps in a different order than the order described in the following example embodiments.

Referring to FIG. 6, at step 602, the method 600 may commence. At step 604, the method 600 may include obtaining, by the processor 244, inputs from the first detection unit and the second detection unit. As described above in conjunction with FIG. 2, the first detection unit may be configured to detect occupant 108 presence inside the vehicle 202, and the second detection unit may be configured to detect that the vehicle 202 may be in the double-lock mode with vehicle doors/trunk in the closed state.

At step 606, the method 600 may include determining, by the processor 244, whether a predetermined condition may be met based on the obtained inputs. In some aspects, the predetermined condition may be met when the occupant 108 may be present inside the vehicle 202 (as detected by the first detection unit) and the vehicle 202 may be in the double-lock mode (e.g., when all vehicle doors/hatches/trunk/frunk in closed state, as detected by the second detection unit).

Responsive to a determination that the predetermined condition may not be met, the method 600 may move back to the step 604. On the other hand, responsive to a determination that the predetermined condition may be met, the method 600 moves to step 608. At step 608, the method 600 may include outputting, by the processor 244 and via the transceiver 242, a notification requesting the occupant 108 to perform a predetermined action. Specifically, the processor 244 may output the notification requesting the occupant 108 to perform the first predetermined action, the second predetermined action, or the third predetermined action, as described above in conjunction with FIGS. 3-5. In some aspects, the processor 244 may provide the notification to the occupant 108 to select the predetermined action from the first predetermined action, the second predetermined action, or the third predetermined action. For example, the occupant 108 may receive such notification from the processor 244 and may select to input the passcode instead of transmitting the occupant image/video to the mobile device 212/vehicle owner 106 when the occupant 108 may be aware of the passcode.

The method 600 stops at step 610.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to enable a vehicle to exit a double-lock mode, the method comprising:
    obtaining, by a processor, inputs from a first detection unit and a second detection unit, wherein the first detection unit is configured to detect presence of an occupant inside the vehicle, and wherein the second detection unit is configured to detect that the vehicle is in the double-lock mode;
    determining, by the processor, that a predetermined condition is met based on the inputs, wherein the predetermined condition is met when the occupant is present inside the vehicle and the vehicle is in the double-lock mode; and
    outputting, by the processor, a notification comprising instructions for the occupant to perform a predetermined action responsive to a determination that the predetermined condition is met to enable the vehicle to exit the double-lock mode,
    wherein the notification comprises the instructions to input a passcode in a vehicle human machine interface (HMI) to enable the vehicle to exit the double-lock mode, and wherein the method further comprises:
        obtaining the passcode from the vehicle HMI when the occupant inputs the passcode in the vehicle HMI;
        comparing the passcode with a pre-stored passcode; and
        causing the vehicle to exit the double-lock mode when the passcode matches with the pre-stored passcode.

2. The method of claim 1, wherein the first detection unit comprises a vehicle interior camera or a vehicle occupant detection sensor disposed inside the vehicle.

3. The method of claim 1, wherein the second detection unit comprises a vehicle door lock sensor disposed inside the vehicle.

4. The method of claim 1, wherein obtaining the inputs comprises obtaining inputs from the first detection unit when the second detection unit detects that the vehicle is in the double-lock mode.

5. The method of claim 1, wherein outputting the notification comprises outputting the notification via a vehicle speaker or a vehicle HMI.

6. A method to enable a vehicle to exit a double-lock mode, the method comprising:
    obtaining, by a processor, inputs from a first detection unit and a second detection unit, wherein the first detection unit is configured to detect presence of an occupant inside the vehicle, and wherein the second detection unit is configured to detect that the vehicle is in the double-lock mode;
    determining, by the processor, that a predetermined condition is met based on the inputs, wherein the predetermined condition is met when the occupant is present inside the vehicle and the vehicle is in the double-lock mode; and
    outputting, by the processor, a notification comprising instructions for the occupant to perform a predetermined action responsive to a determination that the predetermined condition is met to enable the vehicle to exit the double-lock mode,
    wherein the notification comprises the instructions to input responses to a plurality of questions on a vehicle HMI, and wherein the method further comprises:
        obtaining the responses from the vehicle HMI when the occupant inputs the responses on the vehicle HMI;
        comparing the responses with pre-stored responses; and
        causing the vehicle to exit the double-lock mode when the responses match with the pre-stored responses.

7. The method of claim 6, wherein the first detection unit comprises a vehicle interior camera or a vehicle occupant detection sensor disposed inside the vehicle.

8. The method of claim 6, wherein the second detection unit comprises a vehicle door lock sensor disposed inside the vehicle.

9. The method of claim 6, wherein obtaining the inputs comprises obtaining inputs from the first detection unit when the second detection unit detects that the vehicle is in the double-lock mode.

10. The method of claim 6, wherein outputting the notification comprises outputting the notification via a vehicle speaker or a vehicle HMI.

11. A method to enable a vehicle to exit a double-lock mode, the method comprising:
    obtaining, by a processor, inputs from a first detection unit and a second detection unit, wherein the first detection unit is configured to detect presence of an occupant inside the vehicle, and wherein the second detection unit is configured to detect that the vehicle is in the double-lock mode;
    determining, by the processor, that a predetermined condition is met based on the inputs, wherein the predetermined condition is met when the occupant is present inside the vehicle and the vehicle is in the double-lock mode; and outputting, by the processor, a notification comprising instructions for the occupant to perform a predetermined action responsive to a determination that the predetermined condition is met to enable the vehicle to exit the double-lock mode, wherein the notification comprises the instructions to provide a consent to a vehicle HMI to capture an image or video and transmit the image or video to a vehicle owner device, and wherein the method further comprises:

obtaining the consent from the vehicle HMI when the occupant provides the consent;

transmitting the image or video to the vehicle owner device;

receiving owner response from the vehicle owner device to exit the double-lock mode responsive to transmitting the image or video; and causing the vehicle to exit the double-lock mode responsive to receiving the owner response.

12. The method of claim 11, wherein the first detection unit comprises a vehicle interior camera or a vehicle occupant detection sensor disposed inside the vehicle.

13. The method of claim 11, wherein the second detection unit comprises a vehicle door lock sensor disposed inside the vehicle.

14. The method of claim 11, wherein obtaining the inputs comprises obtaining inputs from the first detection unit when the second detection unit detects that the vehicle is in the double-lock mode.

15. The method of claim 11, wherein outputting the notification comprises outputting the notification via a vehicle speaker or a vehicle HMI.

* * * * *